(12) United States Patent
Plantan et al.

(10) Patent No.: US 7,493,994 B2
(45) Date of Patent: Feb. 24, 2009

(54) SPRING BRAKE ACTUATOR WITH MID-LOCATED SPRING

(75) Inventors: Ronald S. Plantan, Westlake, OH (US); Ken E. Scheckelhoff, Elyria, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 150 days.

(21) Appl. No.: 11/012,313

(22) Filed: Dec. 16, 2004

(65) Prior Publication Data
US 2006/0131116 A1 Jun. 22, 2006

(51) Int. Cl.
*B60T 11/00* (2006.01)

(52) U.S. Cl. .................................. 188/153 D; 188/170
(58) Field of Classification Search .................. 303/7; 188/153 D, 153 R, 170; 170/93; 92/130 A, 92/63
See application file for complete search history.

(56) References Cited

U.S. PATENT DOCUMENTS

| | | | | |
|---|---|---|---|---|
| 3,065,997 A | * | 11/1962 | Frankhouser et al. | 92/63 |
| 3,136,227 A | * | 6/1964 | Williams | 92/63 |
| 3,149,542 A | * | 9/1964 | Cruse | 92/128 |
| 3,394,779 A | * | 7/1968 | Heinz et al. | 188/170 |
| 3,563,139 A | * | 2/1971 | Page et al. | 92/63 |
| 3,576,152 A | * | 4/1971 | Chevreux | 92/65 |
| 3,796,138 A | * | 3/1974 | Doyle et al. | 92/63 |
| 3,813,994 A | * | 6/1974 | Swander et al. | 91/471 |
| 3,842,716 A | | 10/1974 | Swander, Jr. | |
| 3,977,308 A | * | 8/1976 | Swander, Jr. et al. | 92/63 |
| 4,777,867 A | * | 10/1988 | Severinsson et al. | 92/29 |

OTHER PUBLICATIONS

Canadian Patent Office communication dated Jul. 14, 2008.

\* cited by examiner

*Primary Examiner*—Bradley T King
(74) *Attorney, Agent, or Firm*—Crowell & Moring LLP

(57) ABSTRACT

A spring-type brake actuator for a pneumatically-operated vehicle brake is provided, with a brake actuator spring located on a front side of the actuator's intermediate flange, between a service brake actuator and a parking brake release actuator. The spring is captured between the intermediate flange and a retaining plate which is connected to the parking brake release actuator via a shaft through the intermediate flange. Because the retaining plate and parking brake release actuator are connected to one another on opposite sides of the intermediate flange, spring expansion is checked, thereby increasing safety during actuator production and servicing by virtually eliminating the potential for uncontrolled spring energy release. The actuator configuration also reduces structural loads on the rear portion of the housing and shifts spring and housing weight closer to the vehicle brake, permitting simpler designs and use of alternative materials, such as plastic or aluminum to lower costs.

25 Claims, 7 Drawing Sheets

SPRING BRAKE ACTUATOR WITH MID-LOCATED SPRING

BACKGROUND AND SUMMARY OF THE INVENTION

The present invention relates to an actuator for the braking system for a vehicle, and in particular to a spring-type brake actuator.

It is well known to employ so-called "spring brake" actuators to provide service, parking and emergency brake operation on vehicles such as commercial trucks, tractors and trailers equipped with lever-operated drum or disc brakes. Spring-type brake actuators are typically pneumatically operated, and are supplied with operating air from a compressed air source on the vehicle. These actuators also typically are arranged in a "fail-safe" manner, i.e., where the actuator defaults to a brake application state upon loss of operating air pressure.

An example prior art spring brake actuator is shown in cross-section view in FIG. 1. Actuator housing 1 includes a rear cylinder 2 in which a rear piston 3 is displaceably arranged. The inner wall of the rear cylinder and a chamber-side of the rear piston define a rear ventilation chamber 4. The other side of the rear piston bears on a brake actuator spring 5. This spring is also known in the art as a "power spring" or a "parking brake spring," and these terms may be used interchangeably. For consistency herein, the terms "brake actuator spring" or "actuator spring" will be used.

The rear ventilation chamber is isolated from the spring side of piston 3 by an annular seal 6. An intermediate flange 8 (also known as a "wall") separates rear cylinder 2 from a front cylinder 9. The intermediate flange 8 traversed by a seal 10 through which passes a sliding rod 11, formed as an extension of rear piston 3. The sliding rod 11 can be displaced in the intermediate flange 8 by the rear piston. A front ventilation chamber 7 within front cylinder 9 is delimited by the cylinder inner wall and a front piston 13 and annular diaphragm 14. The rear piston 3 and the front piston 13 are in non-coupled contact with one another by means of the sliding rod 11, such that the front piston 13 can be displaced in a brake application direction by the rear piston 3. An actuating rod 15 for actuating a brake lever of a vehicle brake is provided on the front side of the front piston 13.

FIG. 1 also shows mounting studs 16 provided for mounting of the actuator 1 on the vehicle brake, as well as a light return spring 18 which biases front piston 13 toward the rear of front chamber 7, and a bellows seal 17 provided to keep contaminants such as brake dust from entering the portion 12 of front cylinder 9 in front of front piston 13.

When no pneumatic pressure is present in the FIG. 1 actuator unit, the brake actuation spring 5 applies a high spring force to rear piston 3, which in turn applies this force via sliding rod 11 to front piston 13 to cause the actuator rod 15 to apply the vehicle brake. In this state, the vehicle brake functions as a parking brake, preventing vehicle movement.

When release of the parking brake is desired, the rear ventilation chamber 4 is filled with compressed air via port 19. As the force generated by the increasing air pressure on the front side of rear piston 3 exceeds the force generated by brake application spring 5, the rear piston 3 and sliding rod 11 move toward the rear of the rear cylinder 2, compressing spring 5. At the same time, as sliding rod 11 moves towards the rear, the force previously applied to front piston 13 is relieved, and the return spring 18 biases the front piston 13 toward the rear of front cylinder 9, thereby withdrawing actuating rod 15 away from and releasing the vehicle brake. The vehicle therefore moves from a state in which it is braked by the brake actuator spring 5, to a non-braked state in which the vehicle may be moved. The vehicle brake is applied as a service during normal operation by admitting compressed air into the front ventilation chamber 7 (via a port not shown in FIG. 1). Because air pressure in rear ventilation chamber 4 continues to hold sliding rod 11 at the rear of the rear cylinder 2, the front piston 13 and actuating rod 15 are free to move forward and backward within the front cylinder as necessary to respond to the operator's brake actuation demands.

In the event of failure of the compressed-air supply during operation of the vehicle, the pressure in the rear ventilation chamber 4 decreases. As a result, the brake actuation spring 5 automatically pushes the rear piston 3 back to the starting (parking) position. Sliding rod 11 thus presses on the front piston 13, which in turn pushes the actuating rod 15 in the brake application direction to actuate the vehicle brake. Thus, fail-safe emergency operation of the vehicle brake is assured.

The spring brake actuators known in the prior art are complicated, are somewhat difficult to produce and service, and suffer from a number of inherent problems. First, in order to generate the very high brake application force needed to ensure full brake application in parking or emergency situations, the brake actuator spring must be powerful. As a result, brake actuator springs are large, heavy and store potentially dangerous amounts of energy when compressed. This requires that the spring brake housing to be heavily built, with relatively thick housing walls and high strength materials, to provide reliable containment of the spring and to provide an adequate foundation to absorb the reaction force of the spring as it presses against the rear end of the housing. This need is particularly acute in the case of prior art actuators, where the housing is continuously subjected to very high loads imposed by the actuator spring, and the housing must be designed to reliably withstand these loads during years of continuous exposure to harsh operating conditions. Ultimately, the need for such heavy housing construction undesirably increases the weight, size and cost of the actuator components.

A further problem with the need for the additional high strength material associated with containment of the spring is that this extra weight and the weight of the spring itself are concentrated at the least desirable location, toward the rear end of the housing. This location is not desirable because it leaves this large mass cantilevered far away from the mounting flange on the vehicle brake, maximizing the stresses placed on the actuator's mounting flanges and/or fasteners. In-service failures of mounting flanges (also known as "wing brackets") and/or their associated fasteners have been observed which are directly attributable to stresses generated by these cantilevered masses.

Another problem with current spring-type brake actuators is the potential for injury or property damage if the brake actuator spring is not properly handled during both actuator manufacture and servicing. The typical spring brake actuator is constructed with a rear portion being detachable from the front portion of the actuator. However, because this rear portion is often the sole component retaining the brake actuator spring, great care must be taken to ensure the spring remains captured or "caged" if the rear portion is to be removed, lest the spring or the rear portion of the actuator be accelerated in an uncontrolled manner away from the housing as it is being disassembled for service. Similar concerns exist during manufacture, where the springs must be carefully controlled during actuator assembly to prevent their inadvertent escape.

The concern with potential injury or damage due to uncontrolled release of spring energy is has resulted in considerable investment in designing positive spring capture devices, technician training, and design of tamper-proof spring brake actuator housings. Nonetheless, injuries caused by improper disassembly remain a possibility. The need to provide the spring control features and fixtures for assembly and servicing also increases labor and tooling costs in both manufacturing and servicing operations, and additional cost and component weight penalties result from the need to provide robust housing flange joints and retainers (e.g., clamping mechanisms) to withstand the separating forces generated by a fully compressed brake actuator spring.

The present spring-type brake actuators are also vulnerable to internal corrosion of the spring and the rear cylinder. The rear cylinder is typically provided with at least one chamber breather on the spring side of the rear cylinder. These breathers relieve any pressure leaking into the rear of the actuator housing from the rear chamber. The corrosion concern arises from the fact that when the rear chamber is depressurized and the brake actuator spring expands back to its parking position, air entering the spring side of the cylinder through the breather contains water in the form of humidity. Rain water, road salt and de-icing solutions are also sources of corrosive water and chemicals which can enter the actuator. Corrosion from such water accumulation has led to brake actuator spring failures (e.g., fractures), defeating the "fail-safe" braking function of the actuator with little or no externally-visible warning. The water has also caused dangerous housing wall thinning, which could result in unexpected rupture of the housing, with consequent loss of emergency braking capability and the potential uncontrolled ejection of the spring and the rear piston/diaphragm.

The geometry of conventional spring brake actuators contributes to a further problem, that of jamming of the parking brake operating rod. The brake actuator spring is typically a spring coil, which is an inherently asymmetrical component which does not always provide a spring force which is perfectly aligned with the parking brake diaphragm's actuator rod. Due to the location and arrangement of the actuator spring and the parking brake rod, and the unsupported length of the rod exposed when the parking brake diaphragm is fully withdrawn, the slightly asymmetric spring force can cause the rod to lean sufficiently far to one side, dramatically increasing friction and wear of the shaft and/or its corresponding bearing surfaces and seals. If permitted to progress unchecked, such increased friction and wear could, at least theoretically, result in drag on the shaft increasing to the point that it is effectively "jammed," i.e., unable to move out of the rear chamber when the pressure in the rear chamber is released. If this were to occur, the parking brake or emergency brake functions would not be performed by the actuator, and the "fail-safe" nature of the brake would be defeated.

In view of one or more of the foregoing problems with current spring-type brake actuators, the present invention provides an improved actuator which is safer, lighter, simpler, more reliable, less costly and/or safer to assemble and service.

The present invention eliminates the need for heavy housing structures and extra brake actuator spring capture features, by substantially rearranging the primary components of a spring brake actuator in a novel manner. In one embodiment, the brake actuator spring is relocated to the front portion of the actuator housing, occupying a position between the front service brake actuator and the rear parking brake actuator. When the spring brake actuator is inactive (i.e., no pressure exists in either the front or rear chambers), the brake actuator spring applies the vehicle brake by pressing on the service brake actuator via an intermediate spring plate, and the service brake actuator in turn presses the brake actuator rod forward in a brake application direction. The parking brake release actuator remains in the rear chamber of the actuator housing, but instead of pressing directly on the service brake actuator (as in the prior art), its attached shaft is now solidly affixed to the rear side of the intermediate spring plate. Thus, when air pressure is applied to the rear chamber, rather than compressing the brake actuator spring into the rear end of the actuator housing, as in the prior art, the present invention's parking brake release actuator draws the intermediate spring plate toward the intermediate body portion of the actuator (hereinafter, the "housing intermediate flange"), compressing the brake actuator spring against the front side (or "floor") of the intermediate flange to remove the spring's force from the actuator rod. This arrangement preserves the "fail-safe" nature of the spring-type brake actuator (i.e., loss of pressure in the rear chamber still results in the brake actuator spring re-applying the brake), while also positively capturing the spring between the spring plate and the intermediate flange.

The present invention offers a number of significant advantages over previous spring brake actuator designs, stemming primarily from the decreased structural requirements on the housing, and the inherent self-capture of the brake actuator spring.

First, because the brake actuator spring is located such that its reaction force is absorbed by the actuator housing's intermediate flange rather than the rear portion of the housing structure, the rear portion now must withstand only the pressure applied to the parking brake actuator (e.g., the pneumatic pressure applied to an actuator diaphragm or piston). This change means that there is no longer any need for thick-section castings or high strength materials to withstand the high tensile loads imposed by a rear-mounted brake actuator spring. The rear housing structure therefore may be designed and built much lighter, and potentially smaller, than previously possible. For example, in place of previous high-strength alloy castings or steel-based housings, lighter structures may be used, such as simple cast aluminum, molded plastic or composite components. In addition to weight savings, use of simpler, lighter rear housing components offers additional cost and corrosion resistance advantages.

Further, due to the much lower head and hoop stresses in the rear housing structure, the joint between the housing intermediate flange and the rear portion of the housing may be made much lighter and simpler while still providing satisfactory sealing and retention of the rear portion of the housing. For example, simple roll crimps or adhesives may potentially be used where previously heavy flanges and thick retaining bands were required. The reduced stresses also provide the opportunity to increase actuator serviceability. Previously, considerable engineering and production effort was invested in designing and producing rear housing joints which were so-called "tamper-proof" joints, in order to discourage improper disassembly of a rear housing in which an uncaged spring was present. Elimination of the actuator spring loads and associated stresses from the rear housing joint eliminates any need for a "tamper-proof" joint, thus permitting the joint to be designed to be released and re-made as needed.

The potential reduction in actuator size resulting from the reduced structural loads and component relocations is also a significant advantage, as space within, and immediately adjacent to, a commercial vehicle wheel rim is at a premium, and will only become more scarce as air-operated commercial vehicle disc brakes and other new brake technologies begin to displace older drum-style brakes.

The present invention also permits reduction in the structure required to mount and support the spring brake actuator on a vehicle brake, as well as enhancing the reliability of the mounting structures. In the past, heavy masses cantilevered far from the mounting surface at the rear of the actuator (i.e., the rear cylinder and brake actuator spring) caused stresses at the mounting flanges and required fasteners having a robust structure. Even with such designs, the mounts were known to occasionally fail. By moving the weight of the brake actuator spring much closer to the mounting flange and eliminating excess weight from the rear housing structure, the loads on the mounting flange and its fasteners are greatly reduced. The mounts therefore may also be redesigned to reduce their size and weight, while continuing to maintain or even increase the reliability of the mounting system.

Another advantage of the present invention's arrangements is the increase in safety afforded during production and servicing operations. With previous spring brake actuators, there was a constant danger of the spring violently escaping the spring brake housing or propelling a portion of the housing toward a technician if proper assembly or disassembly procedures were not followed or if the housing ruptured. By locating the brake actuator spring and the parking brake release actuator on opposite sides of the housing's intermediate flange and then linking these elements together via the intermediate spring plate, the parking brake release actuator positively captures the spring at all times, eliminating the spring release danger. Moreover, this arrangement also minimizes any danger of launching either the rear portion of the housing or the intermediate flange, because once the parking brake release actuator is resting on the intermediate flange (which occurs every time the spring brake is deactivated), further extension of the brake actuating spring is precluded.

The positive capture of the brake actuator spring in the present invention also improves assembly and servicing operations, by allowing both the front and rear portions of the actuator housing to be assembled to, or removed from, the intermediate flange without high spring pressure loads acting against ends of the housing. This permits expendable components within the spring brake actuator to be accessed and replaced with a much lower risk of injury, and in less time than with previous spring brake actuators. Such improvements offer corresponding decreases in assembly and servicing costs.

In further embodiments of the present invention, additional production and servicing advantages may be realized. The parking brake release actuator, its shaft and the intermediate spring plate may be designed in a manner which allows all the pre-load on the spring to be released before the spring is released from the housing's intermediate flange. For example, the intermediate spring plate could be affixed to the parking brake release actuator shaft by a bolt threaded into the center of the shaft. The shaft and the bolt could be made with sufficient length, such that by the time the bolt reaches the end of its engagement with the shaft, the intermediate spring plate and the parking brake actuator are so apart enough that the free length of the spring has been exceeded, removing all pre-load on the spring. The unloaded spring plate could then be removed to, for example, allow the shaft to be extracted for replacement of a seal in the intermediate flange. Alternatively, the spring plate could be welded to the shaft, and the parking brake release actuator be threadably engaged with the shaft on the rear cylinder side of the intermediate flange. Alternative fastening variations which accomplish the objective of unloading the brake actuator spring pre-load will be apparent to those of ordinary skill in the art.

A further advantage of the present invention is the opportunity to eliminate any need for ventilation of the volume in which the brake actuator spring is located, which in turn eliminates the primary source of spring corrosion and spring failure. The present invention therefore offers improved long-term spring brake actuator reliability. In previous spring brake actuator designs, it has been common to provide a vent to atmosphere from the spring side of the rear cylinder, in order to prevent pressure leaking from the rear chamber toward the spring from building up to the point of rendering the parking brake release actuator ineffective (and thereby preclude brake release). In the present invention, because the brake actuator spring has been removed from the chamber containing the parking brake release actuator, there is no need for a breather valve in the vicinity of the brake actuator spring. Corrosion protection may be further enhanced by eliminating essentially any moisture-bearing air exchange between the region around the spring and the rest of the front chamber by providing a simple seal between the outer rim of intermediate spring plate and the inner wall of the front chamber. This aspect of the present invention also contributes to simplification of the design and lower cost by eliminating unnecessary parts (the breather and associated fittings, filters, etc.) and the design and tooling costs associated with machining of housing components to accept the breather and related fittings.

Other objects, advantages and novel features of the present invention will become apparent from the following detailed description of the invention when considered in conjunction with the accompanying drawings.

DETAILED DESCRIPTION OF THE DRAWINGS

Figure 1:
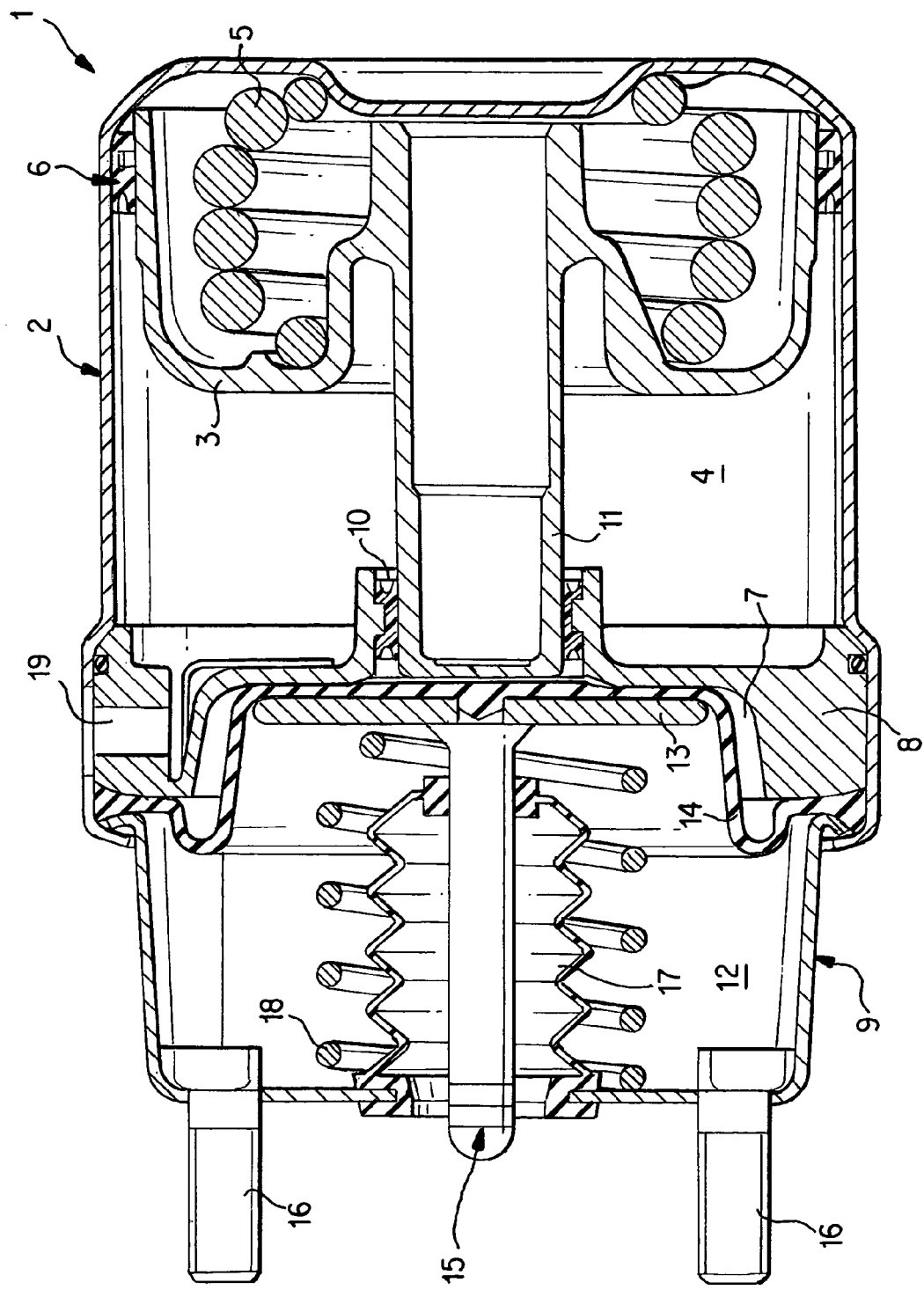
FIG. 1 is a cross-section view of an exemplary previously known spring-type pneumatic brake actuator.
Figure 2:
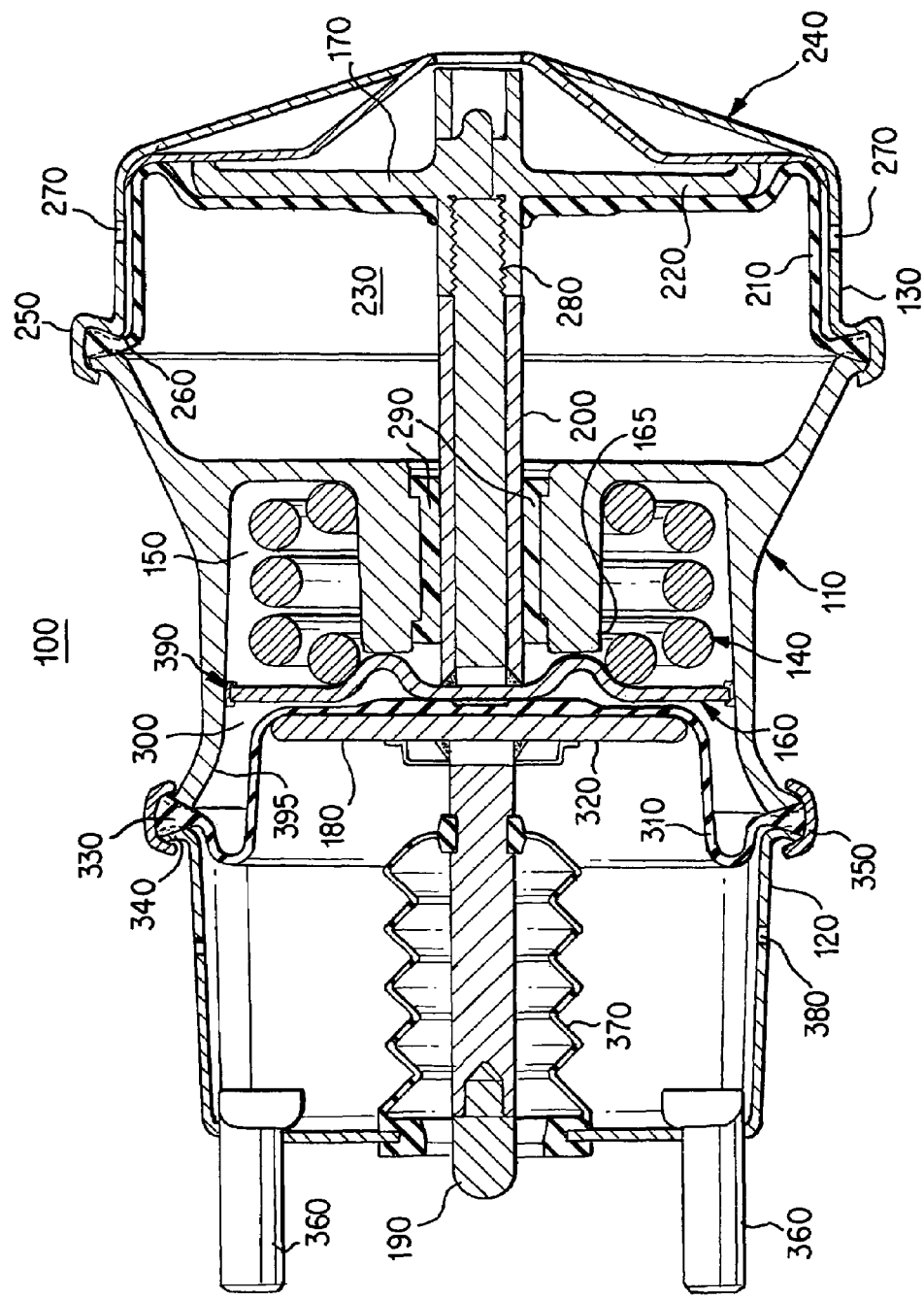
FIG. 2 is a cross-section view of an embodiment of a spring-type brake actuator in accordance with the present invention.

FIG. 2 is a cross-section view of a spring-type brake actuator 100 in accordance with a first embodiment of the present invention.

The actuator housing comprises an intermediate flange 110, front cylinder 120 at a vehicle brake end of spring brake actuator 100, and rear cylinder 130 on the opposite side of intermediate flange 110. The terms "front" and "rear" as used herein describe the directions facing toward and facing away, respectively, a vehicle brake to which the actuator 100 is to be mounted. Thus, in FIG. 2, "front" is the direction toward the left side of the figure, and "rear" is the direction toward the right side of the figure.

The operating elements of spring brake actuator 100 include a brake actuator spring 140, which has one end located in a recess 150 in the front side of intermediate flange 110, and an opposite end resting on a rear-facing side of an intermediate spring plate 160. It is to be understood that the present invention is not limited to a coil spring, but includes any elastic member which provides the energy storage and return function required by a parking brake actuator. For example, alternative spring configurations, including multiple coil springs, leaf springs, cantilevered springs, etc., and alternative elements such as resilient blocks or chargeable high pressure bladders, are within the scope of the present invention.

Also included in spring brake actuator 100 are parking brake release actuator 170, service brake actuator 180, brake actuator rod 190 and connecting shaft 200. Parking brake release actuator 170 in this embodiment comprises a diaphragm 210 and supporting backing plate 220 within a rear chamber 230, the chamber being formed when rear cylinder 130 is mated to intermediate flange 110.

In this embodiment, the outer wall 240 of rear cylinder 130 is a lightweight aluminum cap whose bead flange 250 cooperates with a corresponding bead of intermediate flange 110 to capture an outer rim 260 of rear diaphragm 210 therebetween. In order to minimize manufacturing and material costs, the bead flange 250 here has simply been rolled over and crimped to secure the rear cylinder 130 to intermediate flange 110. Alternatively, a field-serviceable joint, such as a clamping ring, may be provided if the capability to remove the rear cylinder 130 in the field is desired, for example to enable replacement of a diaphragm or an internal seal.

Parking brake release actuator 170 is shown in FIG. 2 in the fully withdrawn position at the rear of rear chamber 230. This position is achieved when sufficient pneumatic pressure to overcome the spring force developed by brake actuating spring 140 has been supplied, via a supply port (not illustrated), to the portion of rear chamber 230 between the diaphragm 210 and the rear side of intermediate flange 110. The portion of the chamber on the opposite side of diaphragm 210 is vented to the atmosphere via ports 270 to ensure any leakage of pressure across parking brake release actuator 170 does not render the release actuator ineffective.

The parking brake release actuator is fixed, in this embodiment via a threaded connection 280 on a front side of diaphragm support plate 220, to a rear end of connecting shaft 200. Connecting shaft 200 is arranged to pass through the center of intermediate flange 110 while being centered and supported by a support seal 290. This support seal also isolates the rear chamber from the front portion of actuator 100. In this embodiment, seal 290 is a replaceable one-piece seal. However, any suitable seal configuration which isolates the front and rear portions of actuator 100 from one another, including multi-part seals and non-replaceable seals, may be used. It is noted that with the present invention's improved serviceability, it can be expected that seal 290 may be replaced during the actuator's service life as a cost-effective approach to extending the service life of the actuator. On the other hand, if in a particular application improved serviceability is of lower importance than lower cost, a less expensive non-replaceable seal could be employed.

Connecting shaft 200 is illustrated in FIG. 2 as welded to the rear side of intermediate spring plate 160, which in turn applies the force generated by parking brake release actuator 170 to compress brake actuator spring 140 into recess 150. The connecting shaft and spring plate may be affixed to one another by any suitable technique which is sufficient to withstand the separating forces applied by the parking brake release actuator and the brake actuator spring, such as welding, brazing, riveting, threaded fastener, etc. Because such affixing techniques are well known, they are not discussed further herein.

Various enhancements or features may be included in alternative embodiments of the present invention to suit different price point targets. One of these is the capability to allow safe field service disassembly of the parking brake release actuator from the intermediate spring plate, for example to allow withdrawal of connection shaft 200 for replacement of seal 290. In this embodiment, connecting threads 280 are sufficiently long to permit the spring plate and rear actuator to be moved apart in a controlled manner until all of the pre-load force stored in spring 140 is released. Alternatively, if no future disassembly of these components is anticipated, for example where rear cylinder cap 240 is roll-crimped to intermediate flange 110, a lower cost, permanent technique for fixing connecting shaft 200 to diaphragm support plate 220 may be used.

Turning to the front cylinder 120 of spring brake actuator 100, within front chamber 300 there are disposed a service brake actuator diaphragm 310 and support plate 320. As with the rear diaphragm, a diaphragm rim 330 is captured between a front cylinder bead flange 340 and a corresponding bead flange on the front edge of intermediate flange 110. Here, the bead flanges are secured by a removable clamping ring 350. The service brake actuator 180 is illustrated in FIG. 2 in the fully disengaged position, where no pneumatic pressure has been applied to the portion of front chamber 300 between the service brake diaphragm 310 and intermediate spring plate 160. As a result, the service brake diaphragm 310 rests, in a non-connected manner, against the front side of intermediate spring plate 160. In addition, the brake actuator rod 190, which engages at a vehicle brake end with a corresponding vehicle brake actuating mechanism, such as a force multiplying lever in a vehicle disc brake (not illustrated) or a drum brake application mechanism, is also in a fully withdrawn position, corresponding to release of the vehicle brake.

In this embodiment, the spring brake actuator 100 is bolted to the vehicle brake via mounting studs 360, and the front end of brake actuator rod 190 protrudes a sufficient distance into the vehicle brake housing (not illustrated), even when in the fully withdrawn position, to ensure the end of the rod can engage the corresponding vehicle brake actuation lever when the rod is moved forward.

The actuator rod 190 is illustrated in this embodiment as having its rear end welded to the front side of service brake support plate 320, however, as with the joining of connecting shaft 200 and intermediate spring plate 160, any suitable joining technique may be employed.

A flexible dust seal 370 (in this embodiment, a bellows) is provided about brake actuator rod 190 to exclude environmental contaminants, such as brake dust, from the interior of front cylinder 120. As with the rear cylinder, atmospheric vent ports 380 are provided in the portion of the front cylinder in front of service brake diaphragm 310 to prevent build-up of pressure and consequent loss of service brake actuator effectiveness.

Because the brake actuator spring 140 is, according to the present invention, located in a space which is not vented to atmosphere, there is little exchange of air between front chamber 300 and intermediate flange recess 150 and thus the risk of spring corrosion is low. It therefore may be acceptable to size the intermediate spring plate 160 to minimize the gap between its outer edge and the outer wall of recess 150 rather than providing a seal about the spring plate and corresponding machined surfaces in the recess, This would avoid the production and materials costs associated with providing the machined surfaces and the seal. Alternatively, if further isolation of the spring 140 from humidity in the air entering front chamber 300 is desired, such a seal may be provided. One approach to isolating the spring is shown in FIG. 2, wherein an annular seal 390 is located between the outer periphery of spring plate 160 and a machined outer wall of recess 150. In a further development, if the pressure supplied to the front chamber is anticipated to be sufficiently clean and dry, the outer wall of recess 150 may taper or step away at a desired location 395 to a larger diameter than at the machined surface. This feature would provide for the positive unseating of seal 390 at a predetermined location during the extension stroke of the brake spring, thereby positively venting any pressure or vacuum accumulated in recess 150 to a chamber supplied with clean, dry air.

In use, the present spring brake cylinder 100 provides the same functionality as previous spring-type brake actuators, but does so in a significantly lighter, safer and/or lower cost manner than heretofore known. The following description of actuator operation refers to the features illustrated in FIG. 2. In addition, in order to illustrate the relative positions of the principal actuator components in different operating positions, oblique cross-section views of an embodiment similar to that shown in FIG. 2, differing only in details, are provided in FIGS. 3 and 4.

As with previous actuators, when no pressure is present in any chamber of spring brake actuator 100, the brake actuator spring 140 applies the vehicle brake by pressing on the rear side of intermediate spring plate 160, which in turn presses with its front surface onto the rear surface of service brake actuator diaphragm 310. The spring force is then transferred to support plate 320, causing brake actuator rod 190 to advance toward the vehicle brake and actuate the brake application mechanism. The vehicle brake is thus applied in the manner of a parking brake. This operating position is illustrated in FIG. 3.

When the vehicle is started and pneumatic braking air is available, the vehicle operator can command release of the vehicle's parking brake. In response, the pneumatic brake system sends air into rear chamber 230. When the air pressure on parking brake release diaphragm 210 (in FIGS. 3 and 4, parking brake release piston 215) is sufficient to generate a parking brake release force which exceeds the spring's brake application force, spring plate 160 begins to compress the spring into recess 150 until the spring plate 160 comes to rest against a flange projection 165, as illustrated in FIGS. 2 and 4. At this point the brake actuator rod 190 has no actuating force applied to it from brake actuator spring 140, and the vehicle brake is fully released for service operation.

In service operation, service braking air is admitted into front chamber 300 in proportion to the amount of brake application desired by the operator, as with previous spring brake actuators. Because rear chamber 230 remains pressurized in normal operation, the brake actuator spring 140 and intermediate spring plate 160 remain in their respective withdrawn positions, and service brake actuator 180 is free to advance or withdraw brake actuator rod 190 to apply or release the vehicle brake as the operator desires.

Figure 3:
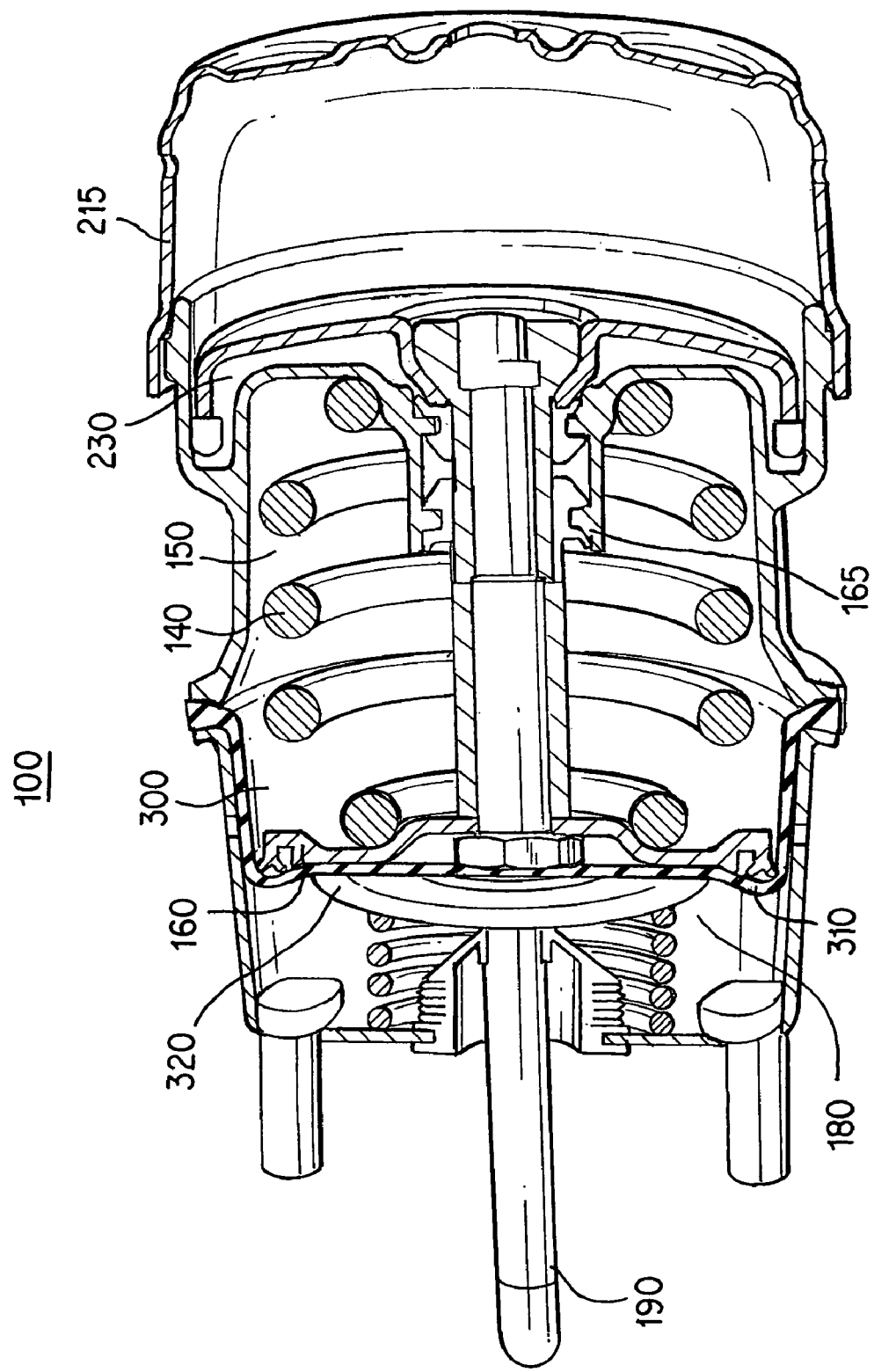
FIG. 3 is an oblique cross-section view of an embodiment of a spring-type brake actuator similar to that shown in FIG. 2, illustrating the actuator in a fully extended position.
Figure 4:
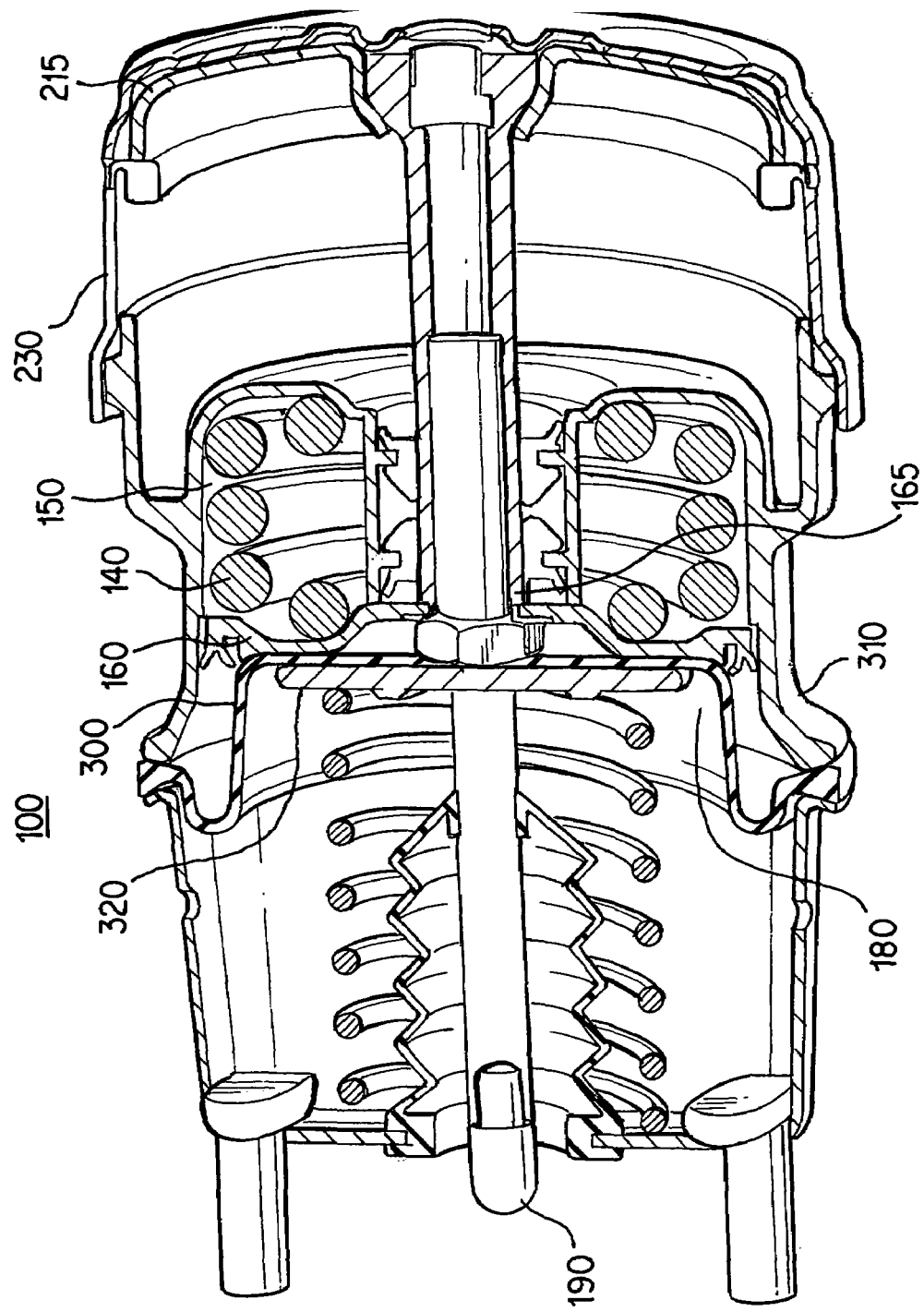
FIG. 4 is an oblique cross-section view of the embodiment of a spring-type brake actuator shown in FIG. 3, illustrating the actuator in a fully withdrawn position.

Off-normal brake operations with the present invention actuator 100 are also the same as with previous spring brake actuators, where loss of pneumatic pressure in rear chamber 230 will allow the brake actuator spring 140 to move from the parking brake release position, illustrated in FIGS. 2 and 4, toward the brake application position, illustrated in FIG. 3, as the release force generated by the parking brake release diaphragm 210 falls.

The present invention's advantages are also evidenced during manufacturing assembly and field service operations. Because the centrally-located brake actuator spring is inherently caged in the present invention, both the front and rear cylinder portions 120, 130 of the actuator 100 may be removed from the intermediate flange 110 without danger of uncontrolled spring energy release (in the case of the front portion, removal may take place after the actuator has been removed from the brake).

For example, if the rear chamber 230 is depressurized, the outer cap 240 of the rear cylinder may be removed without any residual spring or pneumatic force being present. Similarly, after the brake actuator has been removed from the vehicle brake, the front cylinder may be removed without danger because the brake actuator spring reaches the end of its forward travel when the parking brake release actuator comes to rest on the rear surface of the intermediate flange 110.

If further disassembly of the intermediate flange is desired, and the previously-described threaded connections have been provided with the connection shaft, the spring preload may be relieved in a controlled manner and then the intermediate flange components serviced. Alternative intermediate flange disassembly approaches will be readily apparent to those of skill in the art, such as use of a spring compressing fixture to unload the brake in a controlled manner. Assembly during production or reassembly in the field would likewise commence with a no-load initial connection of the spring plate to the parking brake release actuator via the connection shaft, with the necessary spring preload then being added as these parts are brought together.

Figure 5:
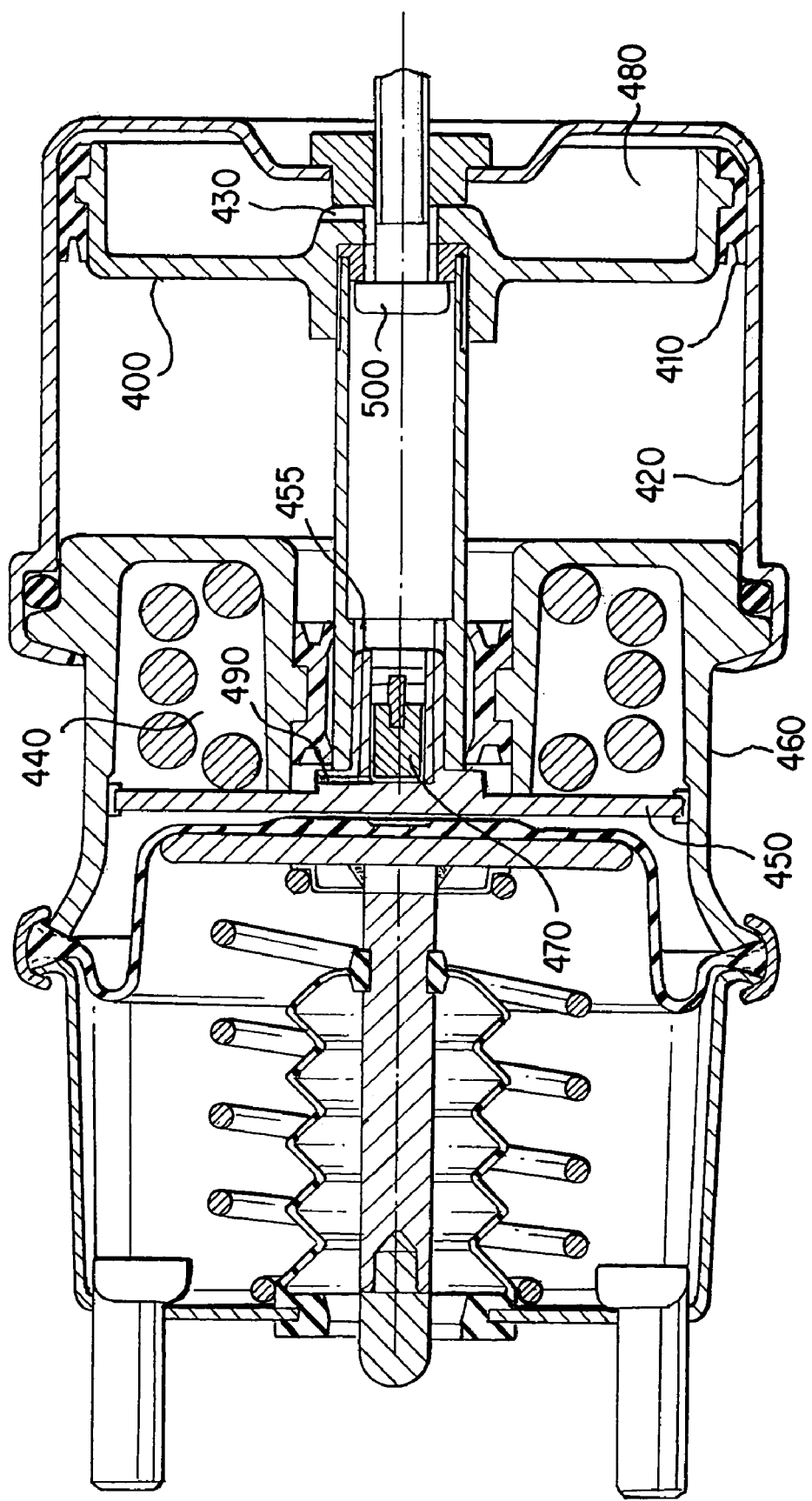
FIG. 5 is a cross-section view of another embodiment of a spring-type brake actuator in accordance with the present invention.

An alternative development of the present invention is illustrated in FIG. 5. Because many of the features of the present invention have already been described in the discussion of the embodiment in FIG. 2, only new or alternative features are identified below.

The FIG. 5 embodiment illustrates an alternative parking brake release actuator configuration, in which the diaphragm and its support plate are replaced by a rigid piston 400 and resilient annular seal 410, which seals the gap between the piston and a smooth inner surface 420 of the rear cylinder. Because the piston 400 need only withstand the pneumatic pressure in the rear chamber and the force it applies to the connection shaft to overcome the spring force, the piston may be formed from any suitable material, preferably a low cost material such as a lightweight metal (e.g., aluminum) or a sufficiently rigid phenolic plastic. The same reason allows for consideration of forming the rear cylinder body from such a substitute material to reduce weight and cost.

FIG. 5 also illustrates an alternative chamber venting arrangement which permits the rear portion of the actuator to be completely sealed from the environment. The arrangements shown in FIG. 5 provide a vent path through which clean, dry air from the service brake chamber is provided to the space 480 on the unpressurized side of piston 400. In this arrangement, a vent channel 430 is provided in piston 400 which communicates with the hollow center of the connection shaft. At the end of the connection shaft near spring plate 450, a pressure relief valve 470 permits flow of air between the space 480 above piston 400 and the space 440 between the spring plate 450 and intermediate flange 460. In this embodiment, the pressure relief valve 470 includes a spring-loaded piston which permits air to pass through vent port 490 when a low differential pressure threshold (on the order of a few psi) is exceeded. Thus, because the latter space 440 only receives clean, dry service brake actuation air, no corrosion-inducing environmental contaminants enter the rear portion of the actuator.

Immediately adjacent to the alternative pressure relief arrangement is shown an alternative approach to affixing the intermediate spring plate to the connection shaft. In this embodiment, s projection 455 is threadably engaged with a corresponding male thread on the connection shaft. Alternatively, screw such as a surface-flush bevel-head screw could be used to secure the spring plate to the front end of the connection shaft from a brake side of the spring plate. As with the embodiment in FIG. 2, if any of these alternative threaded connections is sufficiently long, complete, controlled release of the brake actuator spring preload may be safely achieved.

Figure 6:
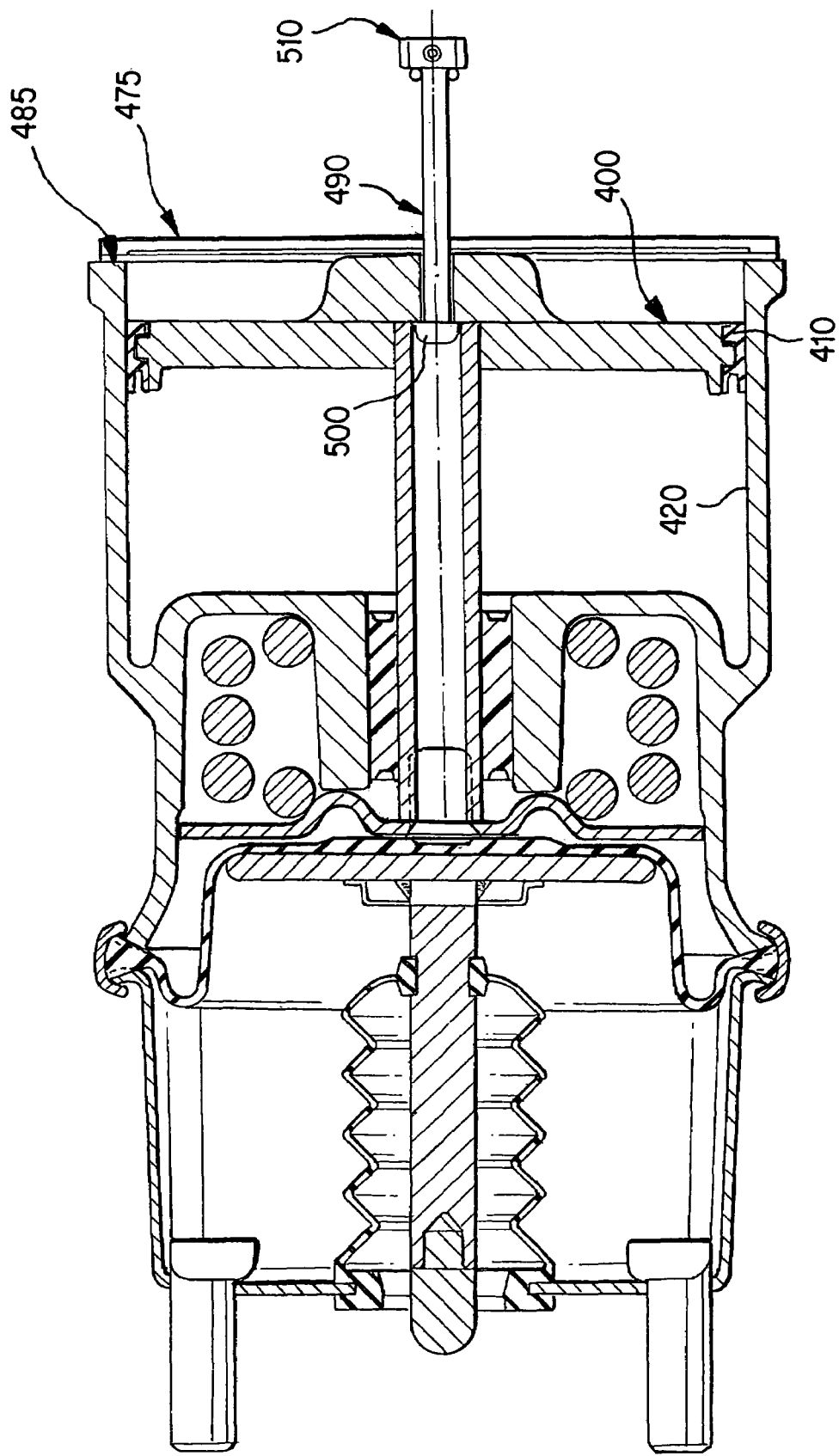
FIG. 6 is a cross-section view of another embodiment of a spring-type brake actuator in accordance with the present invention.

FIG. 6 further illustrates an alternative rear cylinder portion configuration which, in some applications, may provide a more cost effective spring brake actuator from an overall manufacturing and maintenance perspective. In this configuration, the intermediate flange portion of the spring brake actuator and the rear cylinder portion are formed as one piece, and access to the components in the rear cylinder is provided through a cover plate 475, sealed by a gasket 485. As before, because the structural demands on the cover 475 are much lower than with previous spring brake actuators (in this embodiment, the cover 475 sees only very low pressure on both of its surfaces), the cover may be formed from very light and inexpensive materials.

The cover 475 in this embodiment is provided with somewhat greater strength than the minimum required, due to the presence of an additional optional feature to further ease field servicing. As shown in FIG. 6, the cover 475, the piston and the top of the connection shaft may be arranged to permit the introduction of a spring-caging rod 490. Here, the rod is attached via a connection 500 at the inner surface of the connection shaft. Depending on the specific configuration of the parking brake release actuator and the connection shaft, the caging rod may be designed to be permanently (i.e., non-removably) installed in the actuator, as illustrated in FIG. 5, or designed to be removable via, for example, a threaded or keyed ("bayonet") connection, as shown in FIG. 6.

In the FIG. 6 embodiment, the rod 490 is installed in the connection shaft after the rear chamber has been pressurized to fully withdraw the brake actuator spring into the intermediate flange. Once engaged, a collar 510 may be moved down the rod to the surface of cover 475 and locked into place. With the brake actuator spring thus caged, the rear portion of the spring brake actuator may then be separated safely from the front cylinder portion without having to first remove the entire actuator from the vehicle brake, as described in the previous embodiment. Other spring compression approaches which obtain the same end will be obvious to those of ordinary skill, such as threading the rod caging 490 into the connection shaft, threading a nut over the caging rod until the nut bears on cover 470, and then turning the nut to withdraw the caging rod, connection shaft and brake actuating spring back to a caged position.

One of the significant advantages of the present invention's novel brake actuator spring arrangement is that it maintains the overall functionality and external connection configuration as in previous spring brake actuator designs. Previous actuators typically located their service brake and parking brake release pressure inlet ports at approximately the middle of the actuator body, with the service brake port slightly closer to the vehicle brake than the parking brake release port. The present invention's arrangements continue to have the service brake actuator and the parking brake release actuator pressure chambers at the side of the housing intermediate flange, in the same service brake port-forward configuration. An actuator in accordance with the present invention therefore may be easily designed to be compatible with existing brake system hardware and operating systems by locating its pressure inlet ports at or near the port locations of existing actuators. Accordingly, no changes in vehicle brake system hardware or operation would be needed to retrofit this new actuator into an existing vehicle spring brake application.

Figure 7:
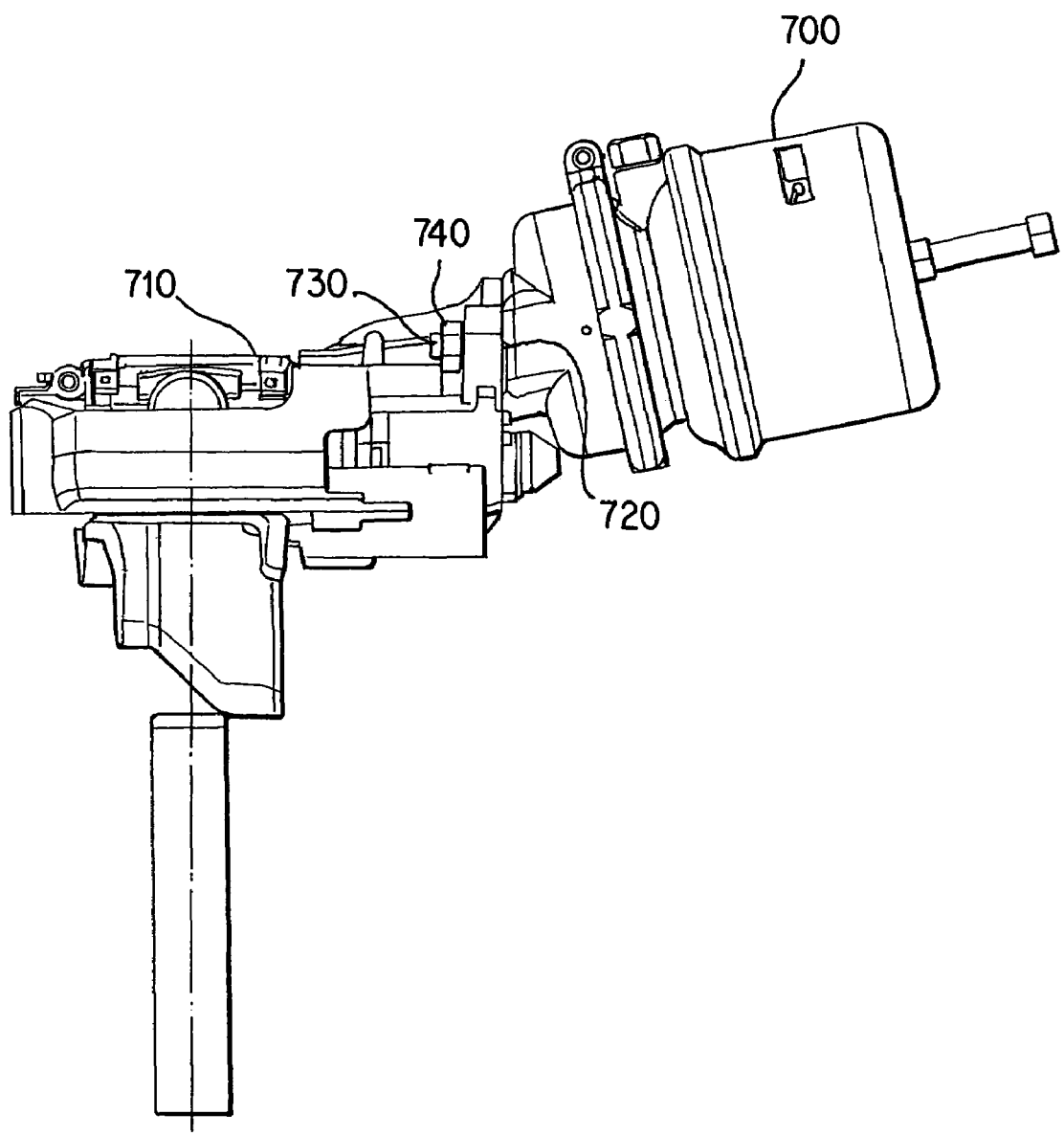
FIG. 7 is a side view of an embodiment of the present invention actuator mounted on a vehicle disc brake caliper.

An exemplary illustration of an embodiment of the present invention actuator mounted on a disc brake caliper for a commercial vehicle is shown in FIG. 7. In this figure, spring brake actuator 700 is shown mounted on caliper 710 in a conventional manner, with the actuator and the caliper abutting one another at mounting flange face 720, and actuator mounting studs 730 being held by nuts 740. Because the mounting of brake actuators on vehicle brakes is well known to those of ordinary skill in the art, further illustration of various embodiments of the present invention in combination various vehicle brakes is not be provided herein.

The foregoing disclosure has been set forth merely to illustrate the invention and is not intended to be limiting. For example, any of a wide variety of well-known flange joining techniques may be employed to join the rear portion of the actuator housing to the housing intermediate flange, including riveting, welding, threaded engagement, band-reinforced crimped flange, etc. Because other such modifications of the disclosed embodiments incorporating the spirit and substance of the invention may occur to persons skilled in the art, the invention should be construed to include everything within the scope of the appended claims and equivalents thereof.

What is claimed is:

1. A spring brake actuator, comprising:
   a brake actuator spring,
   a brake spring retainer,
   a parking brake release actuator,
   a service brake actuator, and
   a spring brake actuator housing containing the brake actuator spring, the service brake actuator and the parking brake release actuator,
   wherein the brake actuator spring is disposed between the service brake actuator and the parking brake release actuator, the parking brake release actuator is coupled to the spring retainer by a connecting shaft, and the brake actuator spring is disposed between the parking brake release actuator and the spring retainer, and
   wherein the parking brake release actuator cooperates with the housing to form a parking brake release chamber, and the parking brake release actuator is actuated by pressurizing the parking brake release chamber.

2. The spring brake actuator of claim 1, further comprising:
   a brake actuator rod disposed at a brake end of the housing,
   wherein the service brake actuator is coupled to the actuator rod such that when the service brake actuator is actuated, the actuator rod is displaced axially from the housing in a brake actuation direction.

3. The spring brake actuator of claim 2, wherein
   the brake actuator spring is arranged to bias the service brake actuator toward the brake application direction, and
   the parking brake release actuator biases the brake actuator spring away from the service brake actuator when the parking brake release actuator is actuated.

4. The spring brake actuator of claim 3, wherein
   a rear end of the brake actuator spring bears on a front side of an actuator housing flange,
   a brake end of the brake actuator spring bears on a spring retainer disposed between the brake actuator spring and the service brake actuator,
   the parking brake release actuator is located on a rear side of the actuator housing flange, and
   the parking brake release actuator is coupled to the spring retainer such that when actuated, the parking brake release actuator applies a brake release force to the spring retainer to draw the brake end of the actuator spring away from the service brake actuator.

5. The spring brake actuator of claim 4, wherein the spring retainer is a spring plate.

6. A spring brake actuator comprising:
a brake actuator spring,
a brake spring retainer,
a parking brake release actuator,
a service brake actuator,
a spring brake actuator housing containing the brake actuator spring, the service brake actuator and the parking brake release actuator, and
a brake actuator rod disposed at a brake end of the housing,
wherein the brake actuator spring is disposed between the service brake actuator and the parking brake release actuator, the parking brake release actuator is coupled to the spring retainer by a connecting shaft, and the brake actuator spring is disposed between the parking brake release actuator and the spring retainer,
wherein the service brake actuator is coupled to the actuator rod such that when the service brake actuator is actuated, the actuator rod is displaced axially from the housing in a brake actuation direction,
wherein the brake actuator spring is arranged to bias the service brake actuator toward the brake application direction, and the parking brake release actuator biases the brake actuator spring away from the service brake actuator when the parking brake release actuator is actuated,
wherein a rear end of the brake actuator spring bears on a front side of an actuator housing flange, a brake end of the brake actuator spring bears on a spring retainer disposed between the brake actuator spring and the service brake actuator, the parking brake release actuator is located on a rear side of the actuator housing flange, and the parking brake release actuator is coupled to the spring retainer such that when actuated, the parking brake release actuator applies a brake release force to the spring retainer to draw the brake end of the actuator spring away from the service brake actuator,
wherein the spring retainer is a spring plate, and
wherein the parking brake release actuator is one of a piston and a diaphragm which cooperates with the housing to form a parking brake release chamber, and the parking brake release actuator is actuated by application of one of pneumatic and hydraulic pressure in the parking brake release chamber.

7. The spring brake actuator of claim 6, wherein
the service brake actuator is one of a piston and a diaphragm which cooperates with the housing to form a service brake chamber, and
the service brake actuator is actuated by application of one of pneumatic and hydraulic pressure in the service brake chamber.

8. The spring brake actuator of claim 7, wherein
an end cover at a parking brake release chamber end of the actuator housing is formed from one of a light-weight metal, a polymer and a composite material.

9. The spring brake actuator of claim 8, wherein
the end cover is joined to the actuator housing flange by an end cover retention means.

10. The spring brake actuator of claim 8, wherein
the end cover is joined to the actuator housing flange by at least one of a roll-crimp joint, a bolted flange, a welded joint, a riveted joint, an annular band clamp, and an adhesive joint.

11. The spring brake actuator of claim 8, wherein
a rear portion of the actuator housing, which includes the parking brake release chamber, is formed at a front end integrally with the actuator housing flange and is open at a rear end, and
the end cover comprises an access plate removably affixed to the rear end of the rear portion of the actuator housing, the end cover and the rear end of the rear portion being sized such that when the end cover is removed, the parking brake release actuator may be removed through the rear end of the rear portion.

12. The spring brake actuator of claim 4, further comprising:
a connecting shaft seal,
wherein
the connecting shaft passes axially through the brake actuator spring and an aperture in the actuator housing flange, and
the connecting shaft seal seals an annular gap between the connecting shaft and an inner wall of the actuator housing flange aperture.

13. The spring brake actuator of claim 12, wherein
the connecting shaft seal has at least one sealing element.

14. The spring brake actuator of claim 13, wherein
at least one of the connecting shaft seal sealing elements is replaceable.

15. The spring brake actuator of claim 12, wherein
at least one of a joint coupling the connecting shaft and the parking brake release actuator and a joint coupling the connecting shaft and the spring retainer is a threaded joint, and
the threads of at least one threaded joint are long enough to permit the brake actuator spring to be in a non-preloaded state prior to complete disengagement of the threaded joint.

16. The spring brake actuator of claim 4, further comprising:
a caging device, said caging device being operable to bias the brake actuator spring against the actuator housing flange during any of actuator housing assembly, disassembly, installation on a brake or removal from a brake.

17. The spring brake actuator of claim 16, wherein
the caging device is a caging rod which engages the parking brake release actuator from a rear end of the housing and applies a withdrawing force to the spring retainer toward the actuator housing flange.

18. A spring brake actuator mechanism, comprising:
a brake actuator spring,
a parking brake release actuator,
a spring retainer,
a connecting shaft, and
a spring brake actuator housing containing the brake actuator spring and the parking brake release actuator,
wherein the parking brake release actuator, spring retainer and connecting shaft are configured to permit the parking brake release actuator to be coupled to the spring retainer by the connecting shaft extending therebetween, with the connecting shaft passing axially through the brake actuator spring, and
wherein the parking brake release actuator cooperates with the housing to form a parking brake release chamber, and the parking brake release actuator is actuated by pressurizing the parking brake release chamber.

19. The spring brake actuator mechanism of claim 18, further comprising:

a brake actuator spring seat,
wherein the spring seat is configured to permit the spring seat to be disposed between the brake actuator spring and the parking brake release actuator, with the connecting shaft passing axially through an aperture in the spring seat.

20. The spring brake actuator mechanism of claim 19, wherein
the brake actuator spring seat is part of an actuator housing flange of the brake actuator housing.

21. The spring brake actuator mechanism of claim 18, wherein
at least one of a joint coupling the connecting shaft and the parking brake release actuator and a joint coupling the connecting shaft and the spring retainer is a threaded joint, and
the threads of at least one threaded joint are long enough to permit the brake actuator spring to be in a non-preloaded state prior to complete disengagement of the threaded joint.

22. A vehicle brake assembly, comprising:
a brake, wherein the brake includes one of a disc brake caliper and a drum brake; and
a spring brake actuator coupled to the brake to apply a brake actuation force, the spring brake actuator having a housing containing
a brake actuator spring,
a service brake actuator,
a parking brake release actuator,
a brake actuator rod disposed at a brake end of the housing,
a spring retainer,
a connecting shaft, and
a spring brake actuator housing containing the brake actuator spring, the service brake actuator and the parking brake release actuator,
wherein
the brake actuator spring is disposed between the service brake actuator and the parking brake release actuator,
the parking brake release actuator is coupled to the spring retainer by the connecting shaft and the brake actuator spring is disposed between the parking brake release actuator and the spring retainer,
the spring retainer bears against the service brake actuator in a non-coupled manner when the parking brake release actuator is in an un-actuated state,
the service brake actuator is coupled to the actuator rod such that when the service brake actuator is actuated, the actuator rod is displaced axially from the housing in a brake actuation direction, and
the parking brake release actuator cooperates with the housing to form a parking brake release chamber, and the parking brake release actuator is actuated by pressurizing the parking brake release chamber.

23. A vehicle axle assembly, comprising:
a vehicle axle;
a brake coupled to the vehicle axle, wherein the brake includes one of a disc brake caliper and a drum brake; and
a spring brake actuator coupled to the brake to apply a brake actuation force, the spring brake actuator having a housing containing
a brake actuator spring,
a service brake actuator,
a parking brake release actuator,
a brake actuator rod disposed at a brake end of the housing,
a spring retainer,
a connecting shaft, and
a spring brake actuator housing containing the brake actuator spring, the service brake actuator and the parking brake release actuator,
wherein
the brake actuator spring is disposed between the service brake actuator and the parking brake release actuator,
the parking brake release actuator is coupled to the spring retainer by the connecting shaft and the brake actuator spring is disposed between the parking brake release actuator and the spring retainer,
the spring retainer bears against the service brake actuator in a non-coupled manner when the parking brake release actuator is in an un-actuated state,
the service brake actuator is coupled to the actuator rod such that when the service brake actuator is actuated, the actuator rod is displaced axially from the housing in a brake actuation direction, and
the parking brake release actuator cooperates with the housing to form a parking brake release chamber, and the parking brake release actuator is actuated by pressurizing the parking brake release chamber.

24. A vehicle, the vehicle being self-propelled vehicle or a non-self-propelled trailer, comprising:
a vehicle body,
a vehicle axle coupled to the vehicle body,
a brake coupled to the vehicle axle, wherein the brake includes one of a disc brake caliper and a drum brake, and
a spring brake actuator coupled to the brake to apply a brake actuation force, the spring brake actuator having a housing containing
a brake actuator spring,
a service brake actuator,
a parking brake release actuator,
a brake actuator rod disposed at a brake end of the housing,
a spring retainer,
a connecting shaft, and
a spring brake actuator housing containing the brake actuator spring, the service brake actuator and the parking brake release actuator,
wherein
the brake actuator spring is disposed between the service brake actuator and the parking brake release actuator,
the parking brake release actuator is coupled to the spring retainer by the connecting shaft and the brake actuator spring is disposed between the parking brake release actuator and the spring retainer,
the spring retainer bears against the service brake actuator in a non-coupled manner when the parking brake release actuator is in an un-actuated state,
the service brake actuator is coupled to the actuator rod such that when the service brake actuator is actuated, the actuator rod is displaced axially from the housing in a brake actuation direction, and
the parking brake release actuator cooperates with the housing to form a parking brake release chamber, and the parking brake release actuator is actuated by pressurizing the parking brake release chamber.

25. A method of operating a spring brake actuator, the spring brake actuator having a housing containing
a brake actuator spring,
a service brake actuator,
a parking brake release actuator,
a brake actuator rod disposed at a brake end of the housing, a spring retainer, and a connecting shaft, wherein the brake actuator spring is disposed between the service brake actuator and the parking brake release actuator, the parking brake release actuator is coupled to the spring retainer by the connecting shaft and the brake actuator spring is disposed between the parking brake release actuator and the spring retainer, the spring retainer bears against the service brake actuator in a non-coupled manner when the parking brake release actuator is in an un-actuated state, and the service brake actuator is coupled to the actuator rod such that when the service brake actuator is actuated, the actuator rod is displaced axially from the housing in a brake actuation direction, the method comprising the acts of:

applying pneumatic or hydraulic pressure to a parking brake release chamber formed by a rear portion of the housing and the parking brake release actuator such that the spring retainer biases the brake actuator spring away from the service brake actuator; and applying pneumatic or hydraulic pressure to a service brake chamber formed by a front portion of the housing and the service brake actuator such that the actuator rod is displaced axially from the housing in a brake actuation direction.

* * * * *